US006834901B2

(12) United States Patent
Löw

(10) Patent No.: US 6,834,901 B2
(45) Date of Patent: Dec. 28, 2004

(54) HANDLE FITTING

(75) Inventor: Matthias Löw, Ratingen (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days.

(21) Appl. No.: 10/769,347

(22) Filed: Jan. 31, 2004

(65) Prior Publication Data

US 2004/0183321 A1 Sep. 23, 2004

Related U.S. Application Data

(63) Continuation of application No. PCT/EP02/06614, filed on Jun. 15, 2002.

(30) Foreign Application Priority Data

Sep. 18, 2001 (DE) ........................................ 101 46 026

(51) Int. Cl.[7] .............................. B60J 5/04; E05B 3/04
(52) U.S. Cl. ................ 296/1.02; 296/146.1; 292/336.3; 16/412
(58) Field of Search ............................ 296/1.02, 146.1, 296/152; 49/502; 16/412; 292/336.3

(56) References Cited

U.S. PATENT DOCUMENTS

| | | | | | |
|---|---|---|---|---|---|
| 1,868,580 | A | * | 7/1932 | McKinney | 70/208 |
| 3,020,075 | A | * | 2/1962 | Johnstone et al. | 292/336.3 |
| 3,935,787 | A | * | 2/1976 | Fisher | 411/16 |
| 5,882,053 | A | * | 3/1999 | Bekins et al. | 292/336.3 |
| 6,439,626 | B1 | * | 8/2002 | Rohlfing | 292/347 |
| 6,447,030 | B1 | * | 9/2002 | Meinke | 292/347 |
| 6,575,508 | B2 | * | 6/2003 | Stuart et al. | 292/336.3 |
| 6,709,033 | B2 | * | 3/2004 | Jooss et al. | 292/336.3 |
| 6,722,716 | B2 | * | 4/2004 | Baser | 292/336.3 |
| 6,749,236 | B2 | * | 6/2004 | Nomura et al. | 292/336.3 |

FOREIGN PATENT DOCUMENTS

| | | |
|---|---|---|
| DE | 3030519 | 2/1982 |
| EP | 0976903 | 2/2000 |
| EP | 1026349 | 8/2000 |

* cited by examiner

*Primary Examiner*—D. Glenn Dayoan
*Assistant Examiner*—Greg Blankenship
(74) *Attorney, Agent, or Firm*—Friedrich Kueffner

(57) ABSTRACT

A handle fitting for a vehicle door has a support attached to the inner side of the door. A turret member provided on the support projects with a turret end inwardly and a slide secures the turret end on the support. A screw is arranged in the slide and moves the slide between mounting and locking positions. In the mounting position the turret member is inserted into the support; in the looking position the turret member is secured on the support. The inner screw end is located outside of a turret member recess in the mounting position. When the screw moves the slide into the locking position, a stop of the screw is supported on the support. In the locking position, the recess receives the inner end of the screw so that the screw acts as a locking bar moved into the turret member.

8 Claims, 9 Drawing Sheets

HANDLE FITTING

This is a continuation of international application PCT/EP02/06614 with an international filing date of Jun. 15, 2002, not published in English according to PCT Article 21(2).

BACKGROUND OF THE INVENTION

1. Field of the Invention

The invention relates to a handle fitting for a motor vehicle door comprising several separate parts including parts that are fastened on the inner side of the door and parts that are mounted on the outer side of the door. One of the parts positioned at the inner side of the door is a support that interacts with the parts mounted on the outer side of the door. The parts mounted on the outer side of the door include the handle of the door and a turret with additional actuation means, for example, a lock cylinder and/or a pushbutton. Instead of the turret with actuating means, a turret decoy that is free of actuation means can be provided. The turret is insertable from the outer side of the door through defined turret openings that are aligned with openings within the support. The turret end projecting from the inner side of the door is secured by locking means relative to the support.

2. Description of the Related Art

A handle fitting of the aforementioned kind is disclosed in patent applications EP 1 026 349 A1 and U.S. 2002/0059698 A1. In such a fitting, a slide having a screw threadably arranged therein is insertable into a lateral guide of the support and the insertion position of the slide is secured by means of an elastic leaf spring engaging the slide. A connection between the slide and the support is not provided. After the turret has been inserted and the screw has been actuated by rotating its outer end, a screw head provided at the inner end of the screw moves against a lateral support surface of the turret resting against the support and causes in this way a movement of the slide until axial stops on the slide and counter stops on the turret engage one another and secure the locking position of the turret in the slide. In the area of the screw, there is no interaction between the turret and the support. The screw engages the turret only non-positively. In the locking position, the turret is clamped like in a vise between the screw head and the counter stops on the support. In the locking position the turret is thus radially loaded by a force.

SUMMARY OF THE INVENTION

It is an object of the present invention to provide a reliable handle fitting of the aforementioned kind that avoids the aforementioned disadvantages.

In accordance with the present invention, this is achieved in that the turret member has a recess is facing the screw at a location of engagement of the screw and in that the inner end of the screw is located outside of the recess in the mounting position. Moreover, this is achieved in that the screw penetrates an opening in the support and, when moving the slide into the locking position, the screw is supported with its stop on the support. Moreover, this is achieved in that the recess in the locking position receives the inner end and converts the screw supported in the support into a locking bar moved into the turret member.

A special feature of the present invention resides in that the screw, in addition to providing the known transport function, i.e., moving the slide between the mounting position and the locking position, is assigned also a locking function for the turret member. For this purpose, there is initially a supporting means for the screw on the support. The supporting means is realized by an opening in the support that is penetrated by the screw. When rotating the screw, the screw is supported by its stop on the support and ensures the transfer of the slide from its mounting position. into the locking position. For achieving the locking function of the screw, a recess is provided within the turret member, and the inner end of the screw moves in a positive-locking way into the recess when the locking position has been reached. In this position, the screw acts as a locking bar that has been inserted into the recess of the turret member and is secured by the support.

DESCRIPTION OF THE PREFERRED EMBODIMENTS

Figure 1:
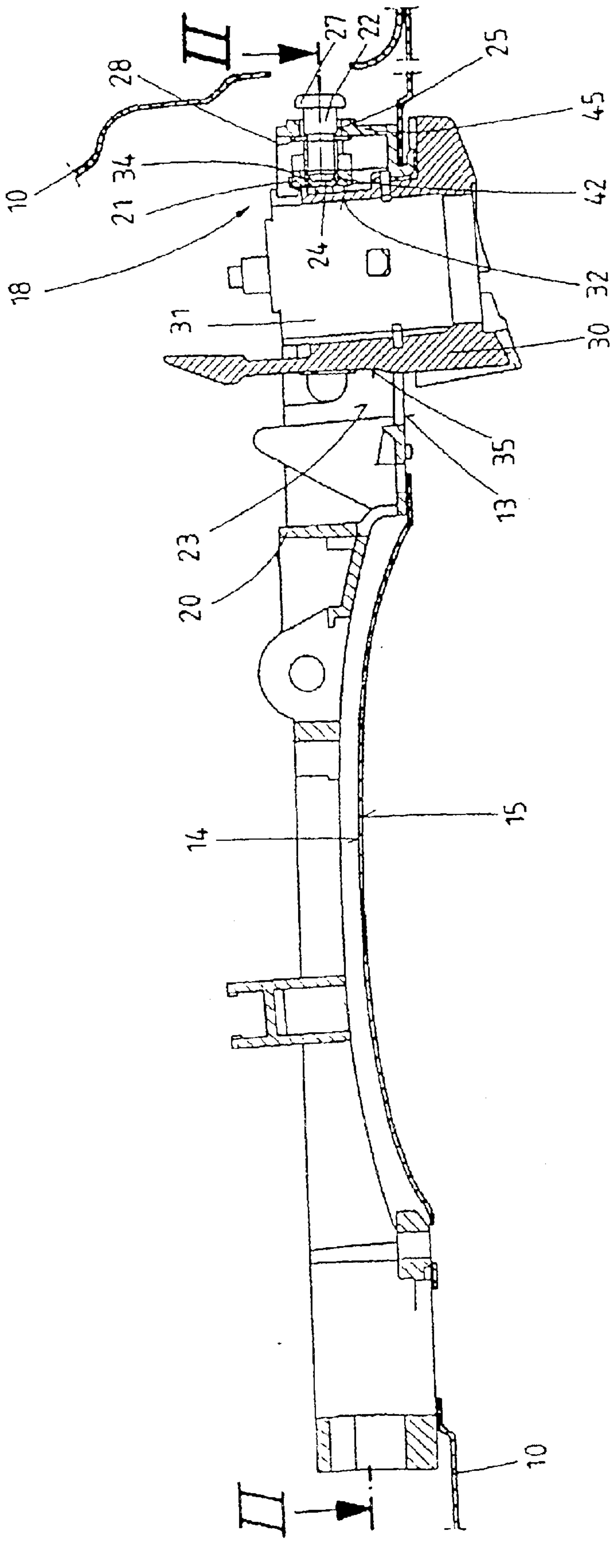
FIG. 1 shows schematically a cross-section of the handle fitting of the present invention in the mounting position on a vehicle door.
Figure 2:
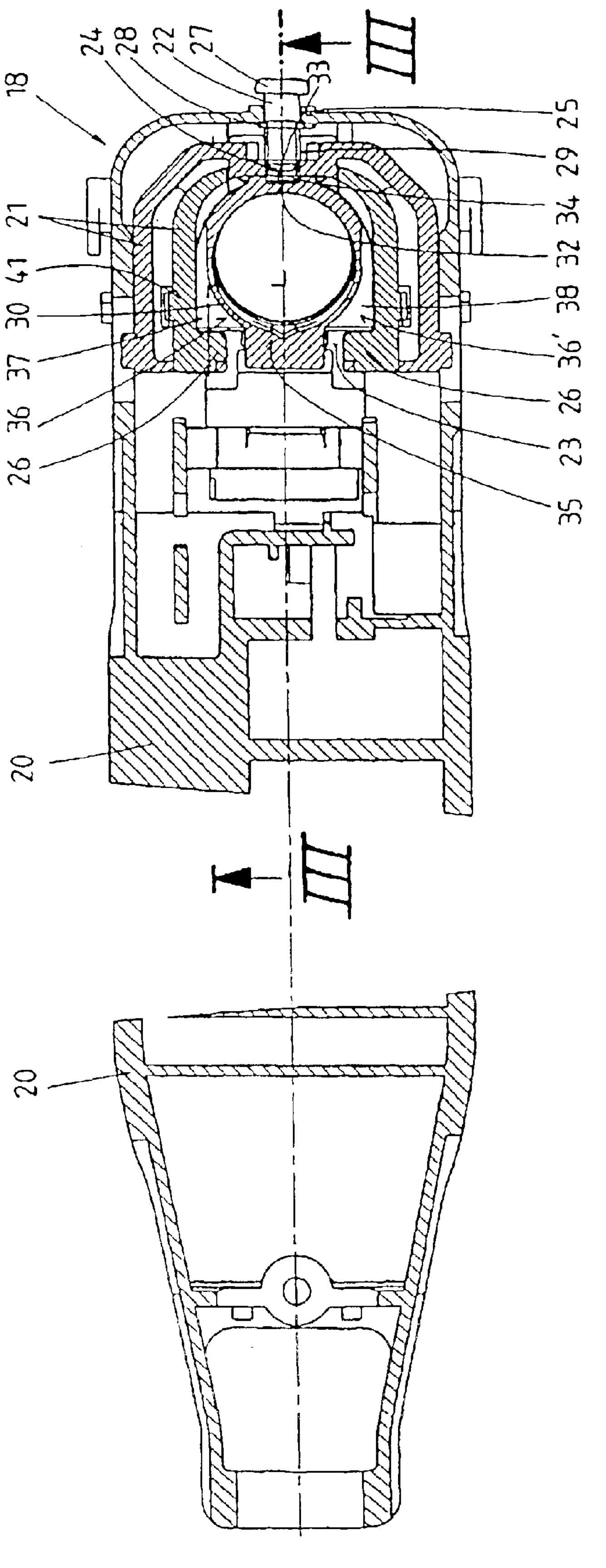
FIG. 2 shows schematically a section along the line II—II of FIG. 1.
Figure 3:
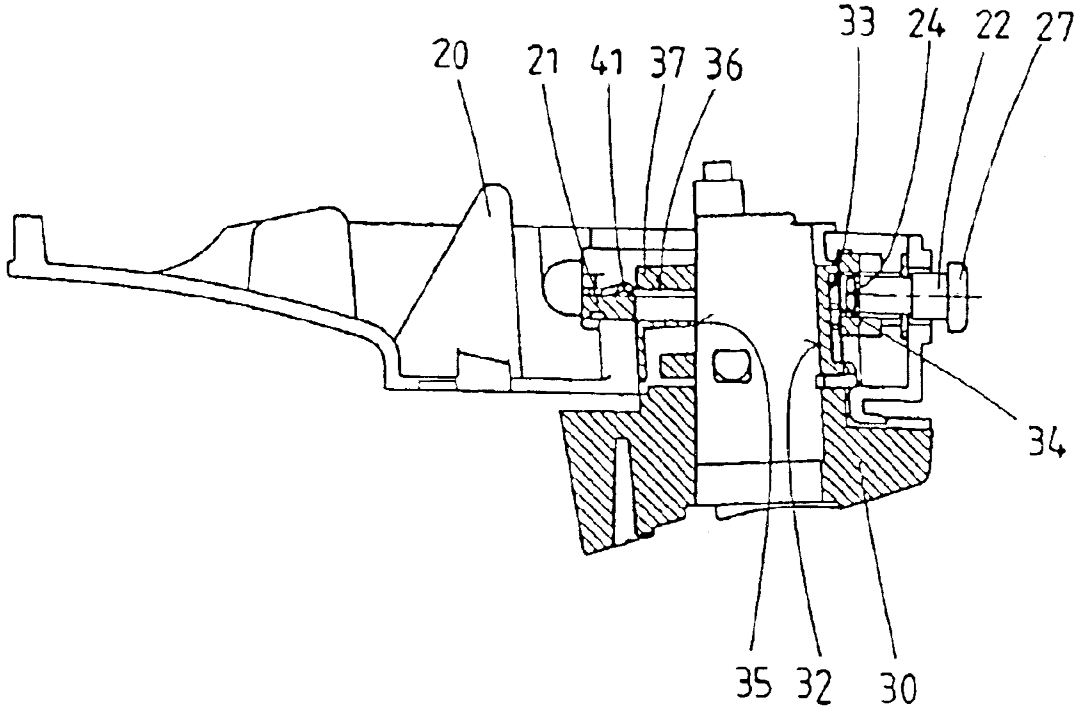
FIG. 3 shows schematically a section along the line III—III of FIG. 2.

FIGS. 1 through 9 show an embodiment of the handle fitting according to the invention. With the aid of the FIGS. 1 through 3 and 9, the configuration of the handle fitting according to the invention will be described first. The handle fitting comprises a support 20 that can be arranged in the illustrated embodiment on a door, for example, a motor vehicle door 10. In the illustrated embodiment, the support 20 is secured on the inner side 14 of the door panel 10 by screws or other fastening means that are not illustrated. In the door panel 10 there is an opening 13 having correlated therewith an opening 23 in the support 20. The rearward turret end 31 of a turret member in the form of a turret 30 with actuating means, as illustrated, or a turret decoy without actuating means can be inserted through the openings 13 and 23 into the support 20. The turret 30 can be provided with additional actuating means, for example, in the form of a lock cylinder and/or in the form of a pushbutton or electrical actuating means. On the outer side 15 of the door, a handle, not illustrated, can be arranged. The handle is provided with an actuator that also penetrates the openings 13, 23. When the handle is actuated, it actuates by means of its actuator a lock or similar means (not illustrated). This handle can be supported in pivotable way at the end of the support 20 opposite the opening 23.

The slide 21 is arranged on the support 20 and is movable approximately parallel to the longitudinal axis of the support

20. For this purpose, a screw 22 is arranged on the support 20. The screw 22 penetrates a passage 25 on the end surface 45 of the support 20. The outer end of the screw 22 has a head 27 that is enlarged relative to a central member of the screw. The head 27 has a diameter that is greater than the diameter of the passage 25 so that the screw 22 can be supported on the flanks of the passage 25. On the inner side of the end surface 45 a securing means, for example, a retainer ring 28, is arranged on the screw 22 so that the screw 22 can be secured in a captive way on the support 20 during pre-mounting of the handle fitting. The slide 21 has a recessed portion 29 at a side facing the screw 22 and the recessed portion receives the retainer ring 28 in the locking position 19. Already in the mounting position 18 illustrated in FIG. 1, the screw 22 engages a threaded receptacle 42 that is arranged on the end of the slide 21 facing the end surface 45.

Figure 4:
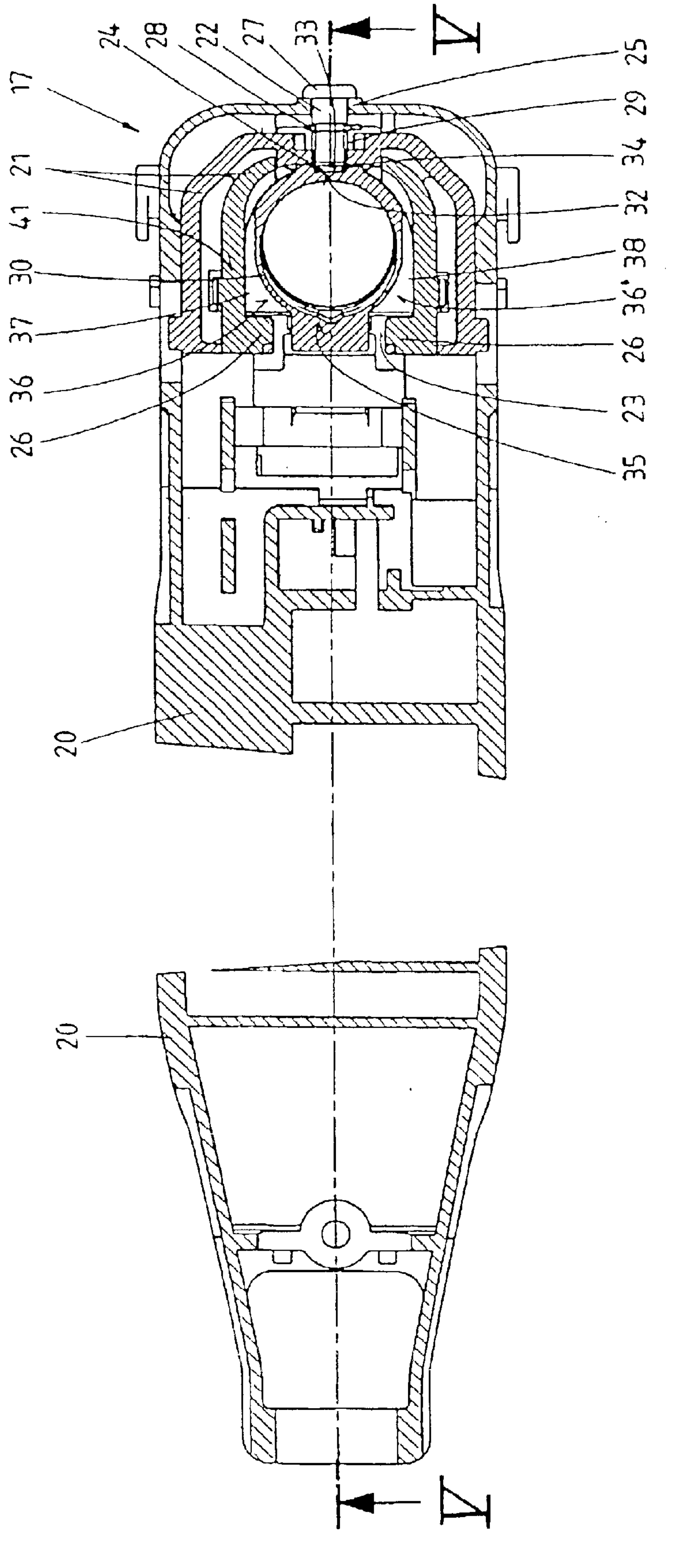
FIG. 4 shows schematically a longitudinal section according to FIG. 2 of the handle fitting according to the invention in an intermediate position.
Figure 5:
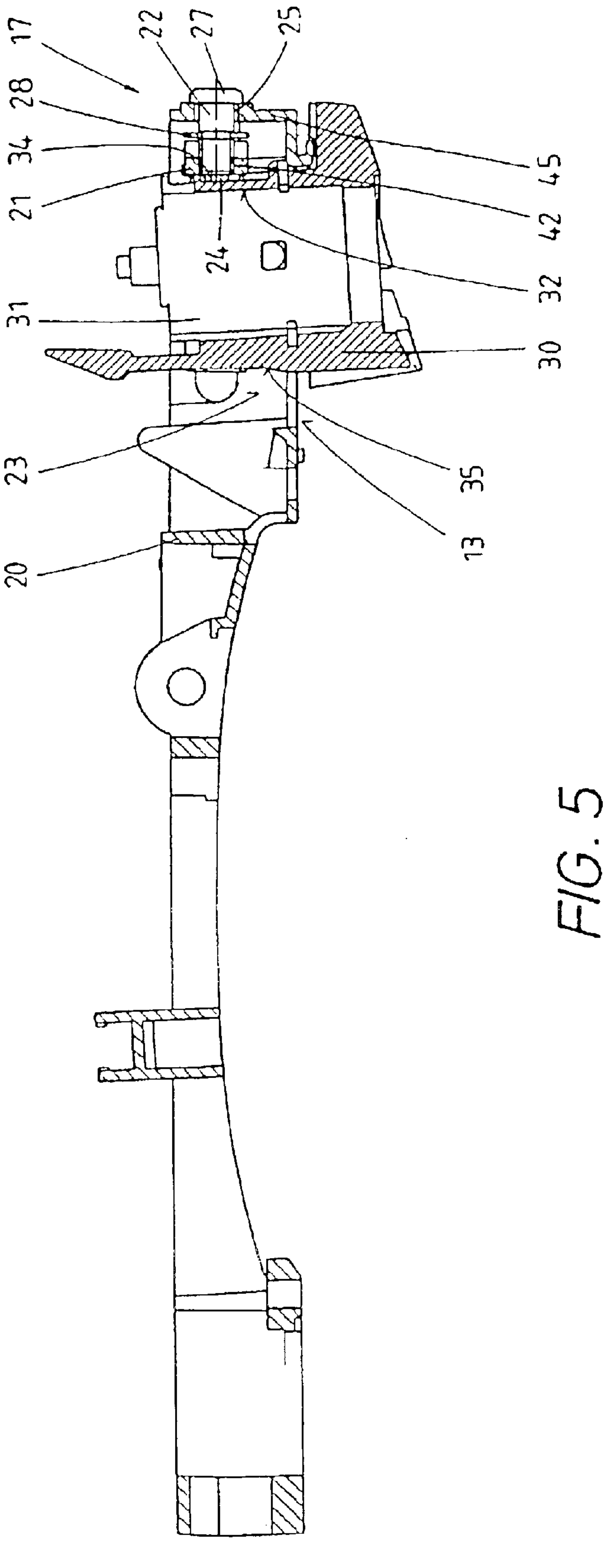
FIG. 5 shows schematically a section along the line V—V of FIG. 4.
Figure 6:
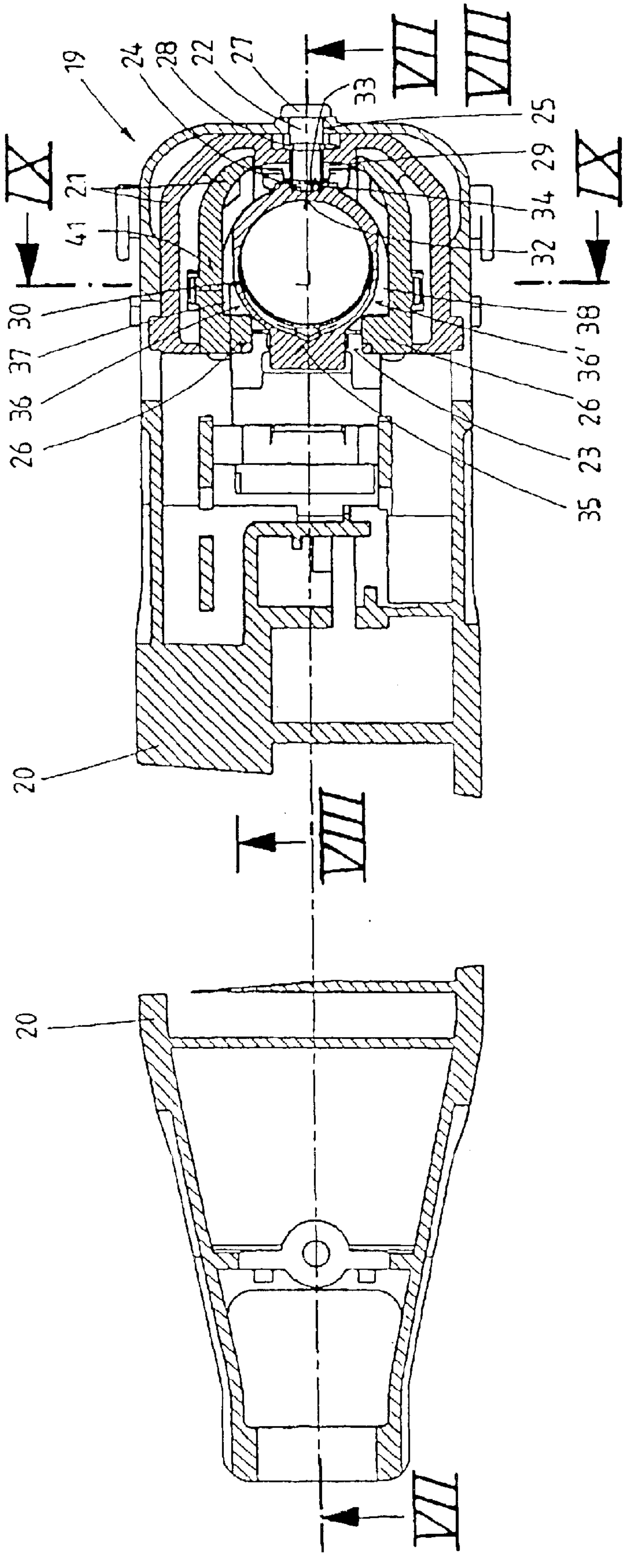
FIG. 6 shows schematically a longitudinal section corresponding to FIGS. 2 and 4 of the handle fitting according to the invention in the locking position.
Figure 7:
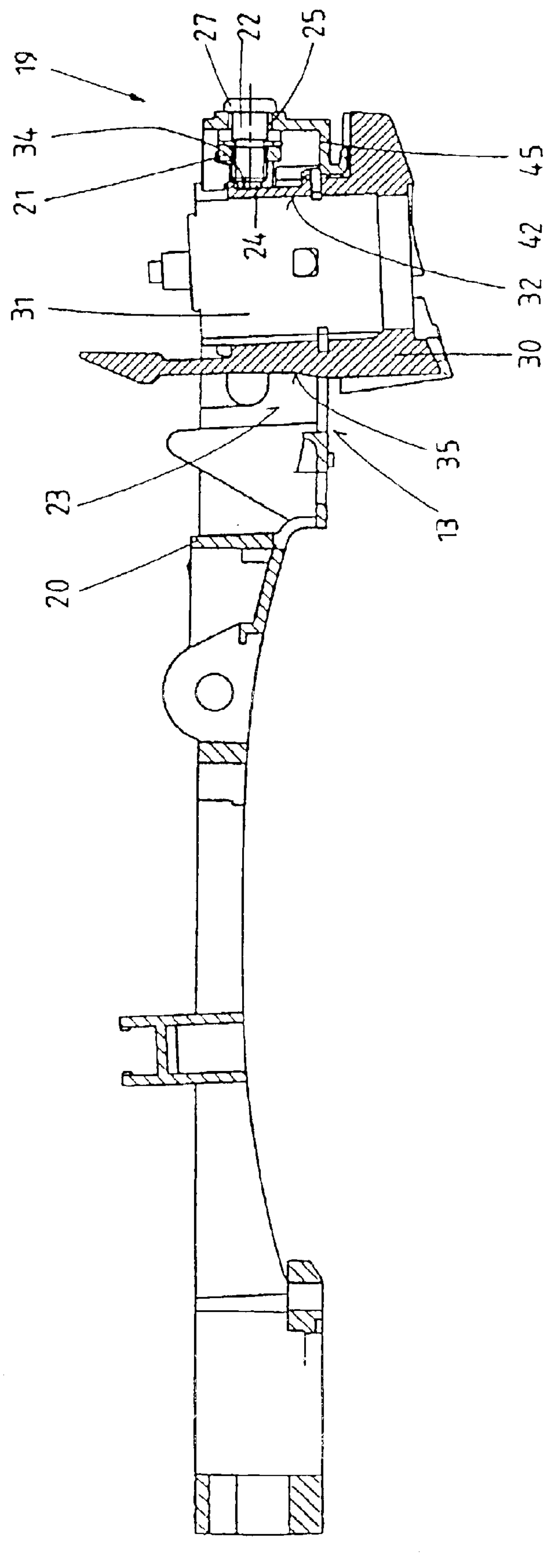
FIG. 7 shows schematically a section along the line VII—VII of FIG. 6.
Figure 8:
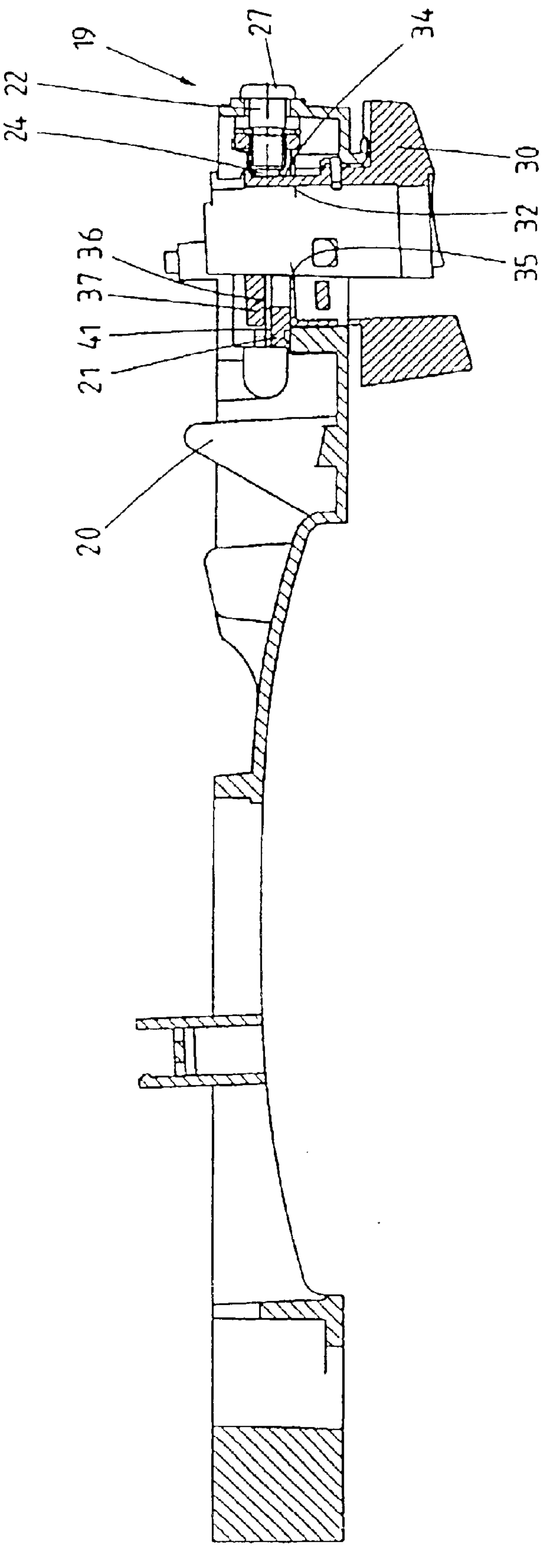
FIG. 8 shows schematically a section along the line VIII—VIII of FIG. 6.
Figure 9:
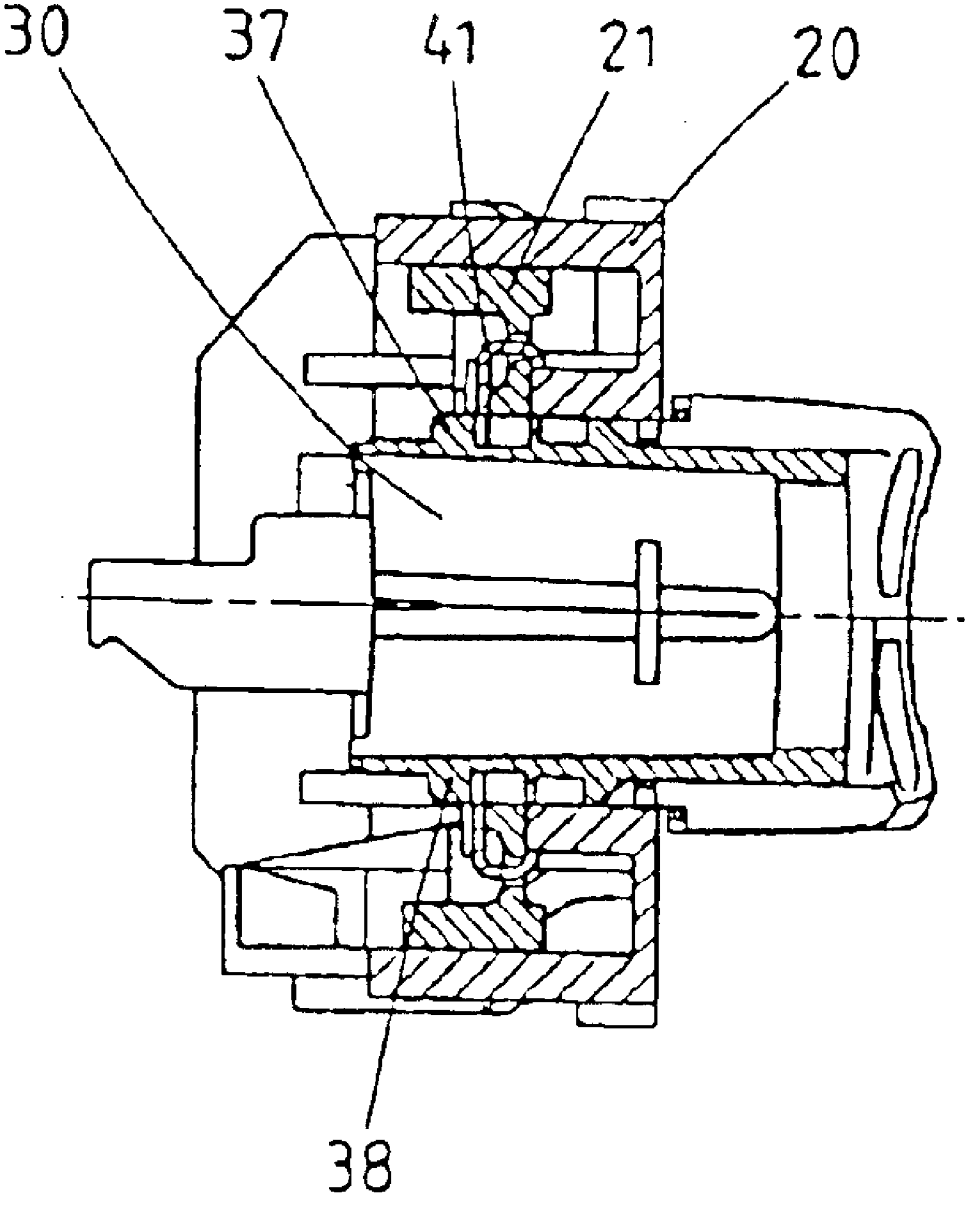
FIG. 9 show schematically a section along the line IX—IX of FIG. 6.

When assembling the vehicle, after initially securing the support 20 on the door panel 10, the assembly person must only insert the turret 30 into the openings 13 and 23. Subsequently, the handle, not illustrated, must be properly positioned on the support 20, and, finally, the screw 22 must be screwed into the support 20. After a few revolutions, the head 27 of the screw 22 rests against the flanks of the end surface 45 of the support 20 surrounding the passage 25. The screw 22 penetrates in this intermediate position 17, as can be seen in FIGS. 4 and 5, completely the threaded receptacle 42 in the slide 21 so that the leading end of the screw 22 rests in a recess 33 provided on the side 32 of the turret facing the end surface 45. The inner end of the screw 22 functions as a locking bar 24. Already in the intermediate position 17, the turret 30 is secured against being pulled out of the support 20.

Upon further rotation of the screw 22 in the threading direction, the slide 21 is moved in the direction toward the end surface 45 of the support 20. In FIGS. 6 through 9, the locking position 19 of the slide 21 on the support 20 is illustrated. The locking bar 24 formed by the screw 22 is inserted into the recess 33 of the turret 30. A locking position 34 is realized between parts 24, 33 as illustrated in the Figures. In the locking position 34, locking elements 26 move behind locking members in the form of projections 37 and 38 provided on the turret 30; the locking elements 26 are arranged at the end of the slide 21 facing away from the screw 22. A spring plate 41 is arranged on the slide 21 that ensures locking of the locking points 36 and 36' at the projections 37 and 38. As illustrated in particular in FIGS. 2, 4, and 6, the locking points 36, 36' and the locking location 34 provide approximately an arrangement of triangular symmetry, preferably within a plane that is approximately perpendicular to the longitudinal axis of the turret 30, so that an optimal distribution of the possible removal forces on the turret 30 is achieved.

While specific embodiments of the invention have been shown and described in detail to illustrate the inventive principles, it will be understood that the invention may be embodied otherwise without departing from such principles.

What is claimed is:

1. A handle fitting for a motor vehicle door, the handle fitting comprising:

a support configured to attach to an inner side of a door panel of the motor vehicle door;

a handle supported on the support;

a turret member supported on the support;

wherein the support has an opening to be aligned with an opening of the motor vehicle door;

wherein the turret member is inserted into the opening of the support and the opening of the motor vehicle door;

wherein the turret member has a turret end projecting inwardly from the inner side of the door panel;

a slide securing the end of the turret member on the support, wherein the slide has a threaded receptacle;

a screw received in the threaded receptacle;

wherein the screw has a stop and has an outer end configured to be actuated for moving the slide between a mounting position and a locking position, wherein in the mounting position the slide allows insertion of the turret member into the support and wherein in the locking position the turret member is secured on the support;

wherein the screw has an inner end engaging at least in the locking position the turret member;

wherein the turret member has a recess facing the screw and providing a location of engagement for the screw;

wherein the inner end of the screw is located outside of the recess in the mounting position;

wherein the screw penetrates a passage provided in the support;

wherein the stop of the screw, when the screw moves the slide into the locking position, is supported on the support;

wherein the recess in the locking position receives the inner end of the screw and converts the screw supported on the support into a locking bar moved into the turret member.

2. The handle fitting according to claim 1, further comprising at least one locking member located opposite the recess relative to the turret member, wherein the slide has at least one locking element interacting with the at least one locking member.

3. The handle fitting according to claim 1, wherein the turret member has two locking members interacting with locking elements of the slide.

4. The handle fitting according to claim 3, wherein the two locking members and the recess are arranged on the turret member in an arrangement of triangular symmetry.

5. The handle fitting according to claim 3, wherein the two locking members and the recess are arranged on the turret member approximately in a plane that is perpendicular to a longitudinal axis of the turret member.

6. The handle fitting according to claim 1, wherein a travel stroke of the screw in the passage is limited by a head of the screw and a securing means arranged on the screw at a spacing from the head.

7. The handle fitting according to claim 6, wherein the slide has a recessed portion at a side facing the screw and the recessed portion receives the securing means in the locking position.

8. The handle fitting according to claim 1, wherein the turret member is a turret comprising actuating means or the turret member is a turret decoy having no actuating means.

* * * * *